(12) United States Patent
Takahara et al.

(10) Patent No.: US 11,586,231 B2
(45) Date of Patent: Feb. 21, 2023

(54) REACTION COMPENSATION DEVICE AND FAST STEERING MIRROR SYSTEM

(71) Applicant: Mitsubishi Electric Corporation, Tokyo (JP)

(72) Inventors: Osamu Takahara, Tokyo (JP); Eiji Yokoyama, Tokyo (JP); Kazuhide Kodeki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 883 days.

(21) Appl. No.: 16/476,204

(22) PCT Filed: Dec. 26, 2017

(86) PCT No.: PCT/JP2017/046724
§ 371 (c)(1),
(2) Date: Jul. 5, 2019

(87) PCT Pub. No.: WO2018/131472
PCT Pub. Date: Jul. 19, 2018

(65) Prior Publication Data
US 2021/0141404 A1    May 13, 2021

(30) Foreign Application Priority Data
Jan. 11, 2017    (JP) .............................. JP2017-002813

(51) Int. Cl.
*G05D 19/02* (2006.01)
*H02K 11/33* (2016.01)
(Continued)

(52) U.S. Cl.
CPC ............ *G05D 19/02* (2013.01); *F16F 7/1011* (2013.01); *G02B 26/0816* (2013.01);
(Continued)

(58) Field of Classification Search
CPC ...... F16F 15/02; F16F 7/1011; F16F 2222/06; F16F 2230/08; F16F 2230/18;
(Continued)

(56) References Cited

U.S. PATENT DOCUMENTS 5,283,682 A   2/1994 Ostaszewski
7,009,752 B1  3/2006 Lorell et al.
(Continued)

FOREIGN PATENT DOCUMENTS

JP    31-8446 Y1     6/1956
WO    2008/066035 A1  6/2008

OTHER PUBLICATIONS

International Search Report and Written Opinion dated Mar. 20, 2018 for PCT/JP2017/046724 filed on Dec. 26, 2017, 9 pages including English Translation of the International Search Report.
(Continued)

*Primary Examiner* — Christopher P Schwartz
(74) *Attorney, Agent, or Firm* — Xsensus LLP

(57) ABSTRACT

A reaction compensation device includes a drive mechanism driving a first movable part with respect to a base, a reaction mass drive mechanism driving a second movable part with respect to the base; and a first relative position sensor measuring a relative position between the first movable part and the base. There is also a second relative position sensor measuring a relative position between the second movable part and the base, a first control system controlling the drive mechanism by taking in a signal outputted from the first relative position sensor as a feedback signal in response to a command value, and a second control system correcting the command value using a correction parameter for adjusting a difference between mass properties of the drive mechanism and reaction mass drive mechanism and for controlling the reaction mass drive mechanism.

18 Claims, 10 Drawing Sheets

(51) Int. Cl.
*F16F 7/10* (2006.01)
*G02B 26/08* (2006.01)
*H02K 33/18* (2006.01)
*H02N 2/10* (2006.01)
*H02N 2/14* (2006.01)
*B64G 1/66* (2006.01)
*B64G 1/22* (2006.01)
*G02B 27/64* (2006.01)

(52) U.S. Cl.
CPC ............. H02K 11/33 (2016.01); H02K 33/18 (2013.01); H02N 2/103 (2013.01); H02N 2/142 (2013.01); *B64G 1/66* (2013.01); *B64G 2001/228* (2013.01); *F16F 2222/06* (2013.01); *F16F 2230/08* (2013.01); *F16F 2230/18* (2013.01); *F16F 2232/02* (2013.01); *F16F 2232/08* (2013.01); *G02B 27/646* (2013.01)

(58) Field of Classification Search
CPC ..... F16F 2232/08; G05B 11/01; G05B 15/02; G05B 19/404; G05D 26/08; G05D 19/02; H02K 11/33; H02K 33/18; H02N 2/103; H02N 2/142; B64G 1/66; B64G 2001/228; G02B 26/0816

USPC ................. 188/378–380; 248/550, 566, 638; 267/136; 355/72

See application file for complete search history.

(56) References Cited

U.S. PATENT DOCUMENTS

| 10,724,598 B2* | 7/2020 | Kishimoto ........... G05B 19/404 |
| 2006/0017908 A1* | 1/2006 | Mayama ............. G03F 7/70766 355/72 |
| 2010/0060220 A1 | 3/2010 | Terada et al. |
| 2014/0268383 A1 | 9/2014 | Bullard et al. |

OTHER PUBLICATIONS

Close et al., "Infrared imaging using a tip-tilt secondary mirror", Proceedings of SPIE, vol. 1920, Aug. 25, 1993, pp. 353-363.

Bullard et al., "Responder® Fast Steering Mirror", Proceedings vol. 8836, Optomechanical Engineering 2013; 883606, Sep. 18, 2013, 6 pages.

Williams et al., "High-Performance Reactionless Scan Mechanism", NASA. Johnson Space Center, The 29th Aerospace Mechanisms Symposium, pp. 334-349.

* cited by examiner

REACTION COMPENSATION DEVICE AND FAST STEERING MIRROR SYSTEM

CROSS-REFERENCE TO RELATED APPLICATIONS

The present application is based on PCT filing PCT/JP2017/046724, filed Dec. 26, 2017, which claims priority to JP 2017-002813, filed Jan. 11, 2017, the entire contents of each are incorporated herein by reference.

FIELD

The present invention relates to a reaction compensation device that reduces force and torque generated when a device having inertia and mass is driven, and to a fast steering mirror system.

BACKGROUND

An optical observation device on a high-precision optical observation satellite may be subject to vibration and disturbance inside the satellite as well as shift and blur of a pointing axis due to a change in attitude at the time of maneuvering of the satellite or depending on control accuracy of an attitude control system. In the following, the shift and blur of the pointing axis will be simply referred to as a "pointing error". A technique widely known as a measure against such a pointing error corrects the pointing error by installing a directivity control mirror inside the optical observation device and driving the mirror on the basis of a pointing error signal outputted from an image sensor. However, such a directivity control mirror has mass and moment of inertia of a mirror part, and it is known that driving the mirror at a high speed itself is a cause of vibration inside the satellite and become a factor in generating the pointing error.

Patent Literature 1 and Non Patent Literature 1 each disclose a fast steering mirror system equipped with a reactionless gimbal system that reduces disturbance caused by driving of a mirror by driving a reaction mass having the same mass property as that of the directivity control mirror in an opposite phase to that of the directivity control mirror. A reaction compensation device disclosed in Patent Literature 1 is composed of a mechanical system and a control system. The mechanical system is composed of a device with inertia and mass, and a position sensor. Such a device with inertia and mass will be hereinafter simply referred to as a "device" in some cases. The device includes a drive mechanism with a mass property provided to satisfy a functional performance of the device, a reaction mass drive mechanism disposed to be opposed to the drive mechanism, and a mounting surface provided with the drive mechanism and the reaction mass drive mechanism. The position sensor is installed to measure a relative position between a movable part and a fixed part of the drive mechanism with the mass property provided to satisfy the functional performance of the devices. The control system is provided to perform control to feed back a detection signal of the position sensor which is installed for measuring the relative position between the movable part and the fixed part of the drive mechanism with the mass property provided to satisfy the functional performance of the device, and to drive the drive mechanism with the mass property provided to satisfy the functional performance of the device in anti-phase with the reaction mass drive mechanism disposed to be opposed to the drive mechanism.

CITATION LIST

Patent Literature

Patent Literature 1: US Patent Application Publication No. 2014/0268383

Non Patent Literature

Non Patent Literature 1: "Responder Fast Steering Mirror", SPIE, Vol. 8836, 883606-2

SUMMARY

Technical Problem

However, in order to satisfy the functional performance of the device, the reaction compensation device disclosed in Patent Literature 1 is required to perfectly match the mass properties, that is, the masses and moments of inertia, of the drive mechanism and the reaction mass drive mechanism. Thus, when the mass properties do not match, the reaction compensation device disclosed in Patent literature 1 cannot cancel out the force and torque generated by the driving of the drive mechanism. Moreover, in the reaction compensation device disclosed in Patent Literature 1, the mass properties need to be perfectly matched so that the mechanisms have to be increased in size and weight.

The present invention has been made in view of the above circumstances, and an object of the present invention is to provide a reaction compensation device in which mass properties of a drive mechanism and a reaction mass drive mechanism need not match perfectly and which can reduce the size and weight of mechanisms used therein.

Solution to Problem

In order to solve the problems and achieve the object, the present invention provides a reaction compensation device comprising: a base; a drive mechanism to drive a first movable part with respect to the base; a reaction mass drive mechanism to drive a second movable part with respect to the base; a first relative position sensor to measure a relative position between the first movable part and the base; a second relative position sensor to measure a relative position between the second movable part and the base; a first control system to receive a signal outputted from the first relative position sensor as a feedback signal in response to an inputted command value to control the drive mechanism; and a second control system to correct the command value based on a correction parameter for adjusting a difference between a mass property of the drive mechanism and a mass property of the reaction mass drive mechanism, and receive a signal outputted from the second relative position sensor as a feedback signal to control the reaction mass drive mechanism.

Advantageous Effects of Invention

The present invention has an advantageous effect that the mass properties of the drive mechanism and the reaction mass drive mechanism need not match perfectly and that the used mechanisms can be reduced in size and weight.

DESCRIPTION OF EMBODIMENTS

A reaction compensation device and a fast steering mirror system according to embodiments of the present invention will now be described in detail with reference to the drawings. Note that the present invention is not necessarily limited by these embodiments.

First Embodiment

Figure 1:
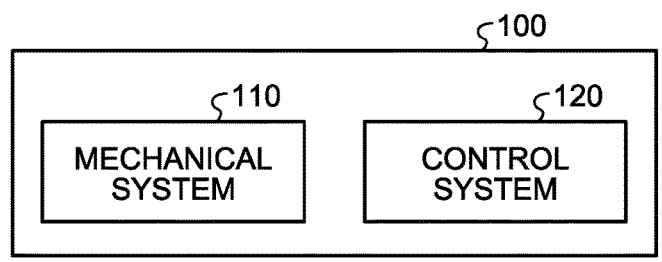
FIG. 1 is a configuration diagram of a reaction compensation device according to a first embodiment of the present invention.
Figure 2:
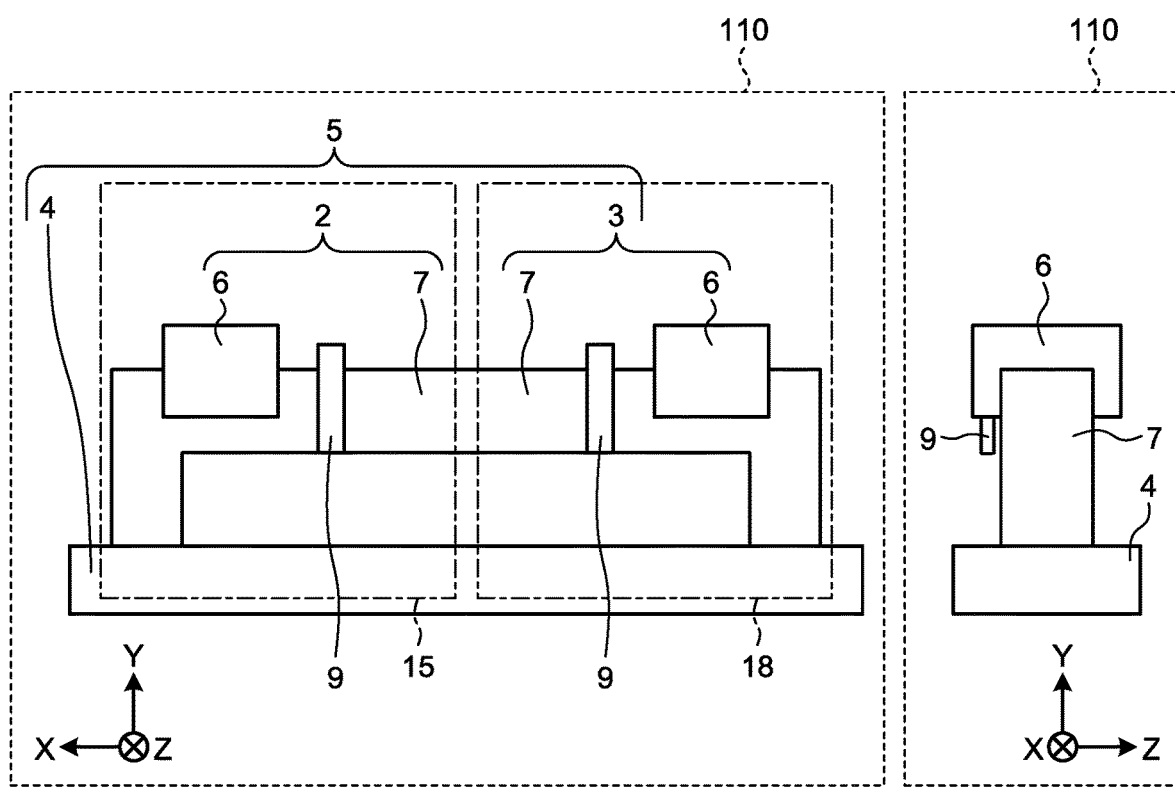
FIG. 2 is a configuration diagram of a mechanical system included in the reaction compensation device according to the first embodiment of the present invention.

FIG. 1 is a configuration diagram of a reaction compensation device 100 according to a first embodiment of the present invention. As illustrated in FIG. 1, the reaction compensation device 100 is composed of a mechanical system 110 and a control system 120. FIG. 2 is a configuration diagram of the mechanical system 110 owned by the reaction compensation device 100 according to the first embodiment of the present invention. FIG. 2 uses right-handed system X-Y-Z coordinates and regards a vertical direction of the mechanical system 110 as a Y-axis direction, a direction orthogonal to the Y-axis direction as an X-axis direction, and a direction orthogonal to both the Y-axis direction and the X-axis direction as a Z-axis direction. The X-axis direction corresponds with a longitudinal direction of a mounting surface 4 described later. The mounting surface 4 may be replaced with a base 4. The left side of FIG. 2 illustrates a front face of the mechanical system 110, and the right side of FIG. 2 illustrates a side face of the mechanical system 110.

The mechanical system 110 is composed of a device 5 with inertia and mass, and a plurality of relative position sensors 9. One of the relative position sensors 9 is a first relative position sensor, and another one of the relative position sensors 9 is a second relative position sensor. The device 5 includes a drive mechanism 2 that has a mass property provided to satisfy the functional performance of the device 5, and a reaction mass drive mechanism 3 that is disposed to be opposed to the drive mechanism 2 in the X-axis direction. The device 5 further includes the mounting surface 4 that is plate-shaped and has a long side along the X-axis direction and a short side along the Y-axis direction.

The drive mechanism 2 and the reaction mass drive mechanism 3 is each composed of a movable part 6 and a fixed part 7. The movable part 6 of one of the drive mechanisms is a first movable part, and the movable part 6 of the other drive mechanism is a second movable part. The fixed part 7 is a plate-shaped member that is placed on an end face of the mounting surface 4 in the Y-axis direction, and extends in the Y-axis direction from the mounting surface 4 and also extends in the X-axis direction along the end face of the mounting surface 4. The fixed part 7 is fixed to the mounting surface 4 and forms a base with the mounting surface 4.

The movable parts 6 of the drive mechanism 2 and the reaction mass drive mechanism 3 are set on their respective fixed parts 7 of the drive mechanism 2 and the reaction mass drive mechanism 3 to be able to slide smoothly in the X-axis direction. The movable parts 6 of the drive mechanism 2 and the reaction mass drive mechanism 3 are provided on their respective fixed parts 7 while being away from each other in the X-axis direction. Each of the plural relative position sensors 9 is set on the fixed part 7. Each of the relative position sensors 9 measures a relative position of the movable part 6 with respect to the fixed part 7. In other words, the relative position sensor 9 measures a relative position of the movable part 6 with respect to a base as the fixed part 7 forms the base.

Figure 3:
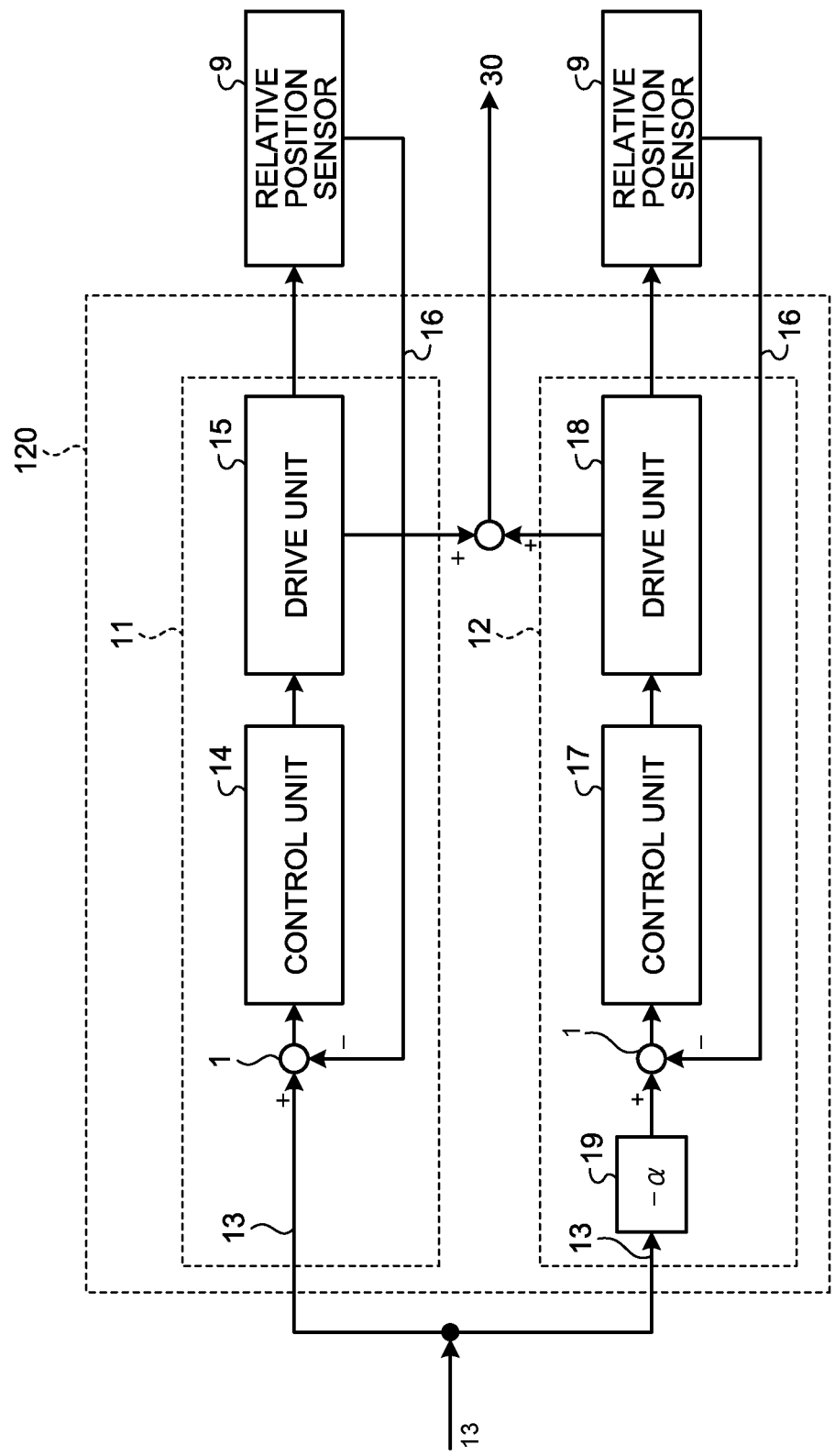
FIG. 3 is a configuration diagram of a control system included in the reaction compensation device according to the first embodiment of the present invention.

FIG. 3 is a configuration diagram of the control system 120 included in the reaction compensation device 100 according to the first embodiment of the present invention. The control system 120 illustrated in FIG. 3 includes a first control system 11 for controlling the drive mechanism 2 illustrated in FIG. 2 and a second control system 12 for controlling the reaction mass drive mechanism 3 illustrated in FIG. 2.

The first control system 11 includes a subtractor 1 that obtains a deviation between a command value 13 for driving the movable part 6 illustrated in FIG. 2 to a target position and a sensor output signal 16 that is a feedback signal outputted from the relative position sensor 9, a control unit 14 that drives the drive mechanism 2 illustrated in FIG. 2, and a drive unit 15 for the drive mechanism 2 illustrated in FIG. 2. The control unit 14 is controlled by Proportional Integral Derivative (PID) control, for example. In the first control system 11, the sensor output signal 16 from the relative position sensor 9 is used to correct the command value 13 in accordance with the relative position between the movable part 6 and the fixed part 7 of the drive mechanism 2 illustrated in FIG. 2. The relative position sensor 9 used in the first control system 11 is the first relative position sensor.

The second control system 12 includes a control unit 17 that drives the reaction mass drive mechanism 3 illustrated in FIG. 2 and a drive unit 18 for the reaction mass drive mechanism 3 illustrated in FIG. 2. The control unit 17 is controlled by PID control, for example. In the second control system 12, the sensor output signal 16 from the relative position sensor 9 that is the second relative position sensor is used to correct the command value 13 in accordance with the relative position between the movable part 6 and the fixed part 7 of the reaction mass drive mechanism 3 illustrated in FIG. 2. The relative position sensor 9 used in the second control system 12 is the second relative position sensor.

The second control system 12 is configured to be able to drive the movable part 6 of the reaction mass drive mechanism 3 in anti-phase with respect to the drive of the movable part 6 of the drive mechanism 2, and includes a correction parameter unit 19. A correction parameter α for correcting a difference in mass property between the movable part 6 of the drive mechanism 2 and the movable part 6 of the reaction mass drive mechanism 3 is set in the correction parameter unit 19. The mass property relates to the mass and moment of inertia of the drive mechanism 2 and the reaction mass drive mechanism 3.

The control unit 14 of the first control system 11 generates a control amount for the drive unit 15 of the first control system 11 on the basis of the deviation that is calculated with respect to the inputted command value 13 on the basis of the sensor output signal 16 fed back from the relative position sensor 9 of the drive mechanism 2. The drive unit 15 of the first control system 11 drives the movable part 6 of the drive mechanism 2 on the basis of the control amount.

On the other hand, the correction parameter unit 19 performs arithmetic processing of multiplying the command value 13 by the correction parameter α. The correction parameter α is a ratio of the mass of the movable part 6 of the drive mechanism 2 to the mass of the movable part 6 of the reaction mass drive mechanism 3, or a ratio of the moment of inertia of the movable part 6 of the drive mechanism 2 to the moment of inertia of the movable part 6 of the reaction mass drive mechanism 3. A result of the arithmetic processing beforehand by the correction parameter unit 19 serves as a command value for the reaction mass drive mechanism 3. The control unit 17 of the second control system 12 generates a control amount for the drive unit 18 of the second control system 12 on the basis of the deviation that is calculated on the basis of the sensor output signal 16 fed back from the relative position sensor 9 of the reaction mass drive mechanism 3. The drive unit 18 of the second control system 12 drives the movable part 6 of the reaction mass drive mechanism 3 on the basis of the control amount generated by the control unit 17.

As described above, the reaction mass drive mechanism 3 is disposed to be opposed to the drive mechanism 2 in the mechanical system 110, and the first control system 11 and the second control system 12 are provided each independently in the control system 120. The reaction compensation device 100 can drive the drive mechanism 2 and the reaction mass drive mechanism 3 at the same time. Moreover, in the reaction compensation device 100, the reaction mass drive mechanism 3 generates the force and torque having the same magnitude as and in anti-phase with the force and torque generated in association with the drive of the drive mechanism 2, so that the force and torque generated in association with the drive of the drive mechanism 2 and the force and torque in anti-phase therewith generated by the reaction mass drive mechanism 3 cancel each other out, thereby making it possible to reduce disturbance 30 (force and torque) generated by the drive of the drive mechanism 2.

When the conventional device disclosed in Patent Literature 1 reduces the disturbance (force and torque) generated by the drive of the drive mechanism 2, the mass properties of the movable part 6 of the drive mechanism 2 and the movable part 6 of the reaction mass drive mechanism 3 need to match perfectly. The reaction compensation device 100 according to the present embodiment can establish the second control system 12 by adjusting the correction parameter α in consideration of the difference in mass property between the movable part 6 of the drive mechanism 2 and the movable part 6 of the reaction mass drive mechanism 3, whereby the mass properties of the movable part 6 of the drive mechanism 2 and the movable part 6 of the reaction mass drive mechanism 3 need not match perfectly.

For example, when $M_A$ is the mass of the movable part 6 of the drive mechanism 2 illustrated in FIG. 2 and $M_B$ is the mass of the movable part 6 of the reaction mass drive mechanism 3 illustrated in FIG. 2, the correction parameter α is calculated by $\alpha = M_A/M_B$. In a case where the drive mechanism 2 is driven at the acceleration of a [m/s$^2$], the reaction mass drive mechanism 3 is made driven at the acceleration of $-\alpha a$ [m/s$^2$] in consideration of the correction parameter α, so that the force generated by the drive of the drive mechanism 2 and the force in anti-phase therewith generated by the reaction mass drive mechanism 3 cancel each other out, thereby making it possible to reduce the force generated inside the device 5. Moreover, when $I_A$ is the moment of inertia of the movable part 6 of the drive mechanism 2 illustrated in FIG. 2 and $I_B$ is the moment of inertia of the movable part 6 of the reaction mass drive mechanism 3 illustrated in FIG. 2, the correction parameter α is calculated by $\alpha = I_A/I_B$. In a case where the drive mechanism 2 is in drive at the angular acceleration of ω[rad/s$^2$], the reaction mass drive mechanism 3 is driven at an angular acceleration of $-\alpha\omega$[rad/s$^2$] in consideration of the correction parameter, so that the torque generated by the drive of the drive mechanism 2 and the torque in anti-phase therewith generated by the reaction mass drive mechanism 3 are mutually canceled out, thereby making it possible to reduce the force generated inside the device 5. As can be seen from these examples, when the mass $M_B$ of the movable part of the reaction mass drive mechanism is smaller than the mass $M_A$ of the movable part of the drive mechanism, or when the moment of inertia $I_B$ of the movable part of the reaction mass drive mechanism is smaller than the moment of inertia $I_A$ of the movable part of the drive mechanism, the correction parameter α equals 1.0 or larger.

The reaction compensation device 100 according to the first embodiment can independently control the movable part of the drive mechanism and the movable part of the reaction mass drive mechanism, and can reduce the force and torque generated inside the device 5 by driving the reaction mass drive mechanism so as to cancel the torque and force generated by the movable part of the drive mechanism having the mass property. Moreover, the reaction compensation device 100 according to the first embodiment has the correction parameter unit for adjusting the difference between the mass property of the drive mechanism and the mass property of the reaction mass drive mechanism, thereby making it possible to reduce the force and torque generated inside the device 5 by the adjustment of the correction parameter unit without matching the mass properties of the mechanisms. Furthermore, since the correction parameter can be adjusted, even the reaction mass drive mechanism with a reduced mass property relative to the drive mechanism can reduce the force and torque generated inside the device 5, and can make the device 5 to be reduced in weight and size. Because the drive mechanism and the reaction mass drive mechanism are independent of each other, the function can be ensured even when the latter fails.

Second Embodiment

Figure 4:
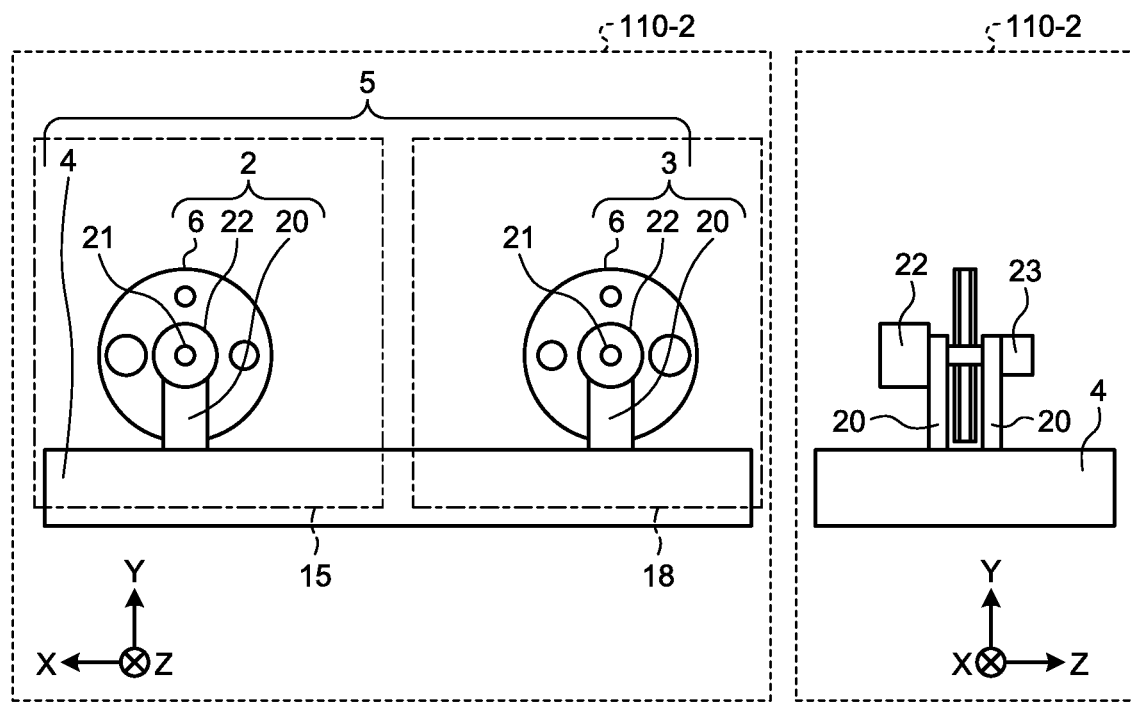
FIG. 4 is a configuration diagram of a mechanical system included in the reaction compensation device according to a second embodiment of the present invention.

FIG. 4 is a configuration diagram of a mechanical system 110-2 included in the reaction compensation device 100 according to a second embodiment of the present invention. In the mechanical system 110 of the first embodiment, each of the drive mechanism 2 and the reaction mass drive mechanism 3 is a translational drive mechanism, whereas in the mechanical system 110-2 according to the second embodiment, the drive mechanism 2 and the reaction mass drive mechanism 3 are disposed in line symmetry on the mounting surface 4. Each of the drive mechanism 2 and the reaction mass drive mechanism 3 has a rotary shaft 21 that is supported by a support base 20 extending in the Y-axis direction from the mounting surface 4. A rotary drive mechanism 22 and a relative angle sensor 23 are provided to the support base 20.

The rotary drive mechanism 22 has a motor (not illustrated) built therein, and the motor is connected to one end of the rotary shaft 21 in the Z-axis direction. As the motor rotates, the movable part 6 of each of the drive mechanism 2 and the reaction mass drive mechanism 3 rotates.

The relative angle sensor 23 is a rotary encoder, for example. The relative angle sensor 23 is connected to another end of the rotary shaft 21 in the Z-axis direction. The movable part 6 rotates as the rotary shaft 21 rotates, and therefore the relative angle sensor 23 measures a relative angle of the movable part 6 with respect to the support base 20 which is a fixed part. In other words, the fixed part and the support base 20 form a base, and the relative angle sensor 23 measures a relative angle between the movable part 6 and the base.

As with the first embodiment, in the reaction compensation device 100 according to the second embodiment, the reaction mass drive mechanism 3 generates the force and torque having the same magnitude as and in anti-phase with the force and torque generated by the drive of the drive mechanism 2, so that the force and torque generated by the drive of the drive mechanism 2 and the force and torque in anti-phase therewith generated by the reaction mass drive mechanism 3 cancel each other out, thereby making it possible to reduce the disturbance 30 (force and torque) generated by the drive of the drive mechanism 2.

Third Embodiment

Each of the drive mechanism 2 and the reaction mass drive mechanism 3 is the single rotary drive mechanism 22 in the second embodiment, but each of the drive mechanism 2 and the reaction mass drive mechanism 3 may be a multijoint drive mechanism configured based on a combination of a plurality of arms and one or more rotary shafts.

In this case, the relative angle sensor 23 is disposed at each joint of the multijoint drive mechanism forming each of the drive mechanism 2 and the reaction mass drive mechanism 3 to be able to measure a relative angle between links connected to the joint. The first control system 11 includes a control system for each joint forming the drive mechanism 2, where an angle outputted from the relative angle sensor 23 is fed back to the control system for each joint. The second control system 12 includes a control system for each joint forming the reaction mass drive mechanism 3, where an angle outputted from the relative angle sensor 23 is fed back to the control system for each joint.

As with the first and second embodiments, in the reaction compensation device 100 according to the third embodiment, the reaction mass drive mechanism 3 generates the force and torque having the same magnitude as and in anti-phase with the force and torque by the drive of the drive mechanism 2, so that the force and torque generated by the drive of the drive mechanism 2 and the force and torque in anti-phase therewith generated by the reaction mass drive mechanism 3 cancel each other out, thereby making it possible to reduce the disturbance 30 (force and torque) generated by the drive of the drive mechanism 2.

Fourth Embodiment

Figure 5:
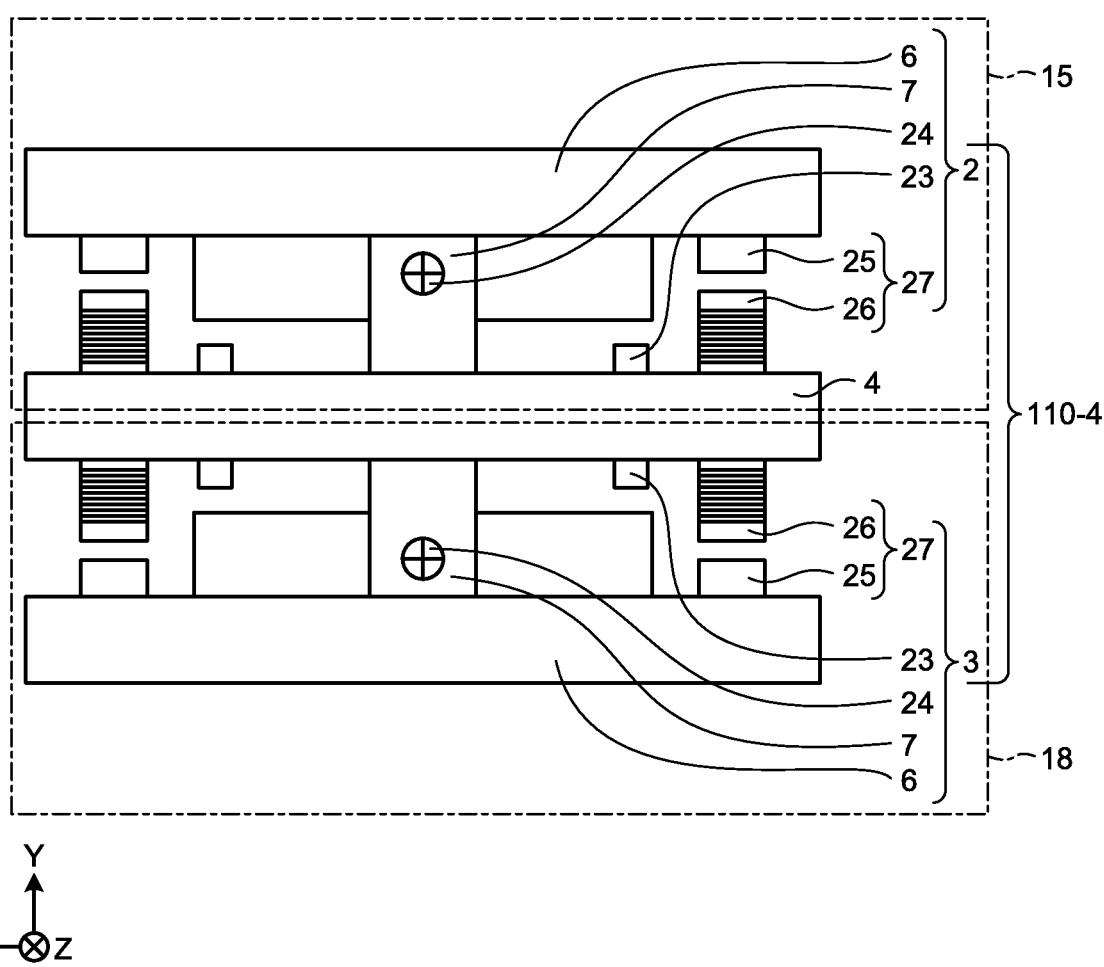
FIG. 5 is a configuration diagram of a mechanical system included in the reaction compensation device according to a fourth embodiment of the present invention.

FIG. 5 is a configuration diagram of a mechanical system 110-4 included in the reaction compensation device 100 according to a fourth embodiment of the present invention. The drive mechanism 2 and the reaction mass drive mechanism 3 are installed on the same plane of the mounting surface 4 in the first to third embodiments, but in a case where the drive mechanism 2 and the reaction mass drive mechanism 3 are rotary mechanisms, the drive mechanism 2 and the reaction mass drive mechanism 3 may be disposed to sandwich the mounting surface 4 therebetween as illustrated in FIG. 5. Specifically, the mechanical system 110-4 includes the mounting surface 4, a pair of the fixed parts 7 installed on one and another end faces of the mounting surface 4 in the Y-axis direction, a pair of rotary hinges 24 provided to the pair of fixed parts 7, respectively, a pair of the movable parts 6 rotatably is provided through the rotary hinges 24 which are mounted along with the fixed parts 7 at both surfaces on the mounting surface 4, a plurality of permanent magnets 25 provided on the radially outer sides of the movable parts 6 on edge-side portions thereof facing the mounting surface 4, and coils 26 provided on the mounting surfaces 4 to face the permanent magnets 25 in the Y-axis direction. The fixed part 7 and the mounting surface 4 form a base.

The plurality of permanent magnets 25 and coils 26 provided at one end side of the mounting surface 4 in the Y-axis direction constitute a voice coil actuator 27 on the drive mechanism 2 side. The plurality of permanent magnets 25 and coils 26 provided at another end side of the mounting surface 4 in the Y-axis direction constitute the voice coil actuator 27 on the reaction mass drive mechanism 3 side. The voice coil actuator 27 is a moving-magnet system actuator.

The drive mechanism 2 is constructed of the movable part 6, the fixed part 7, the relative angle sensor 23, the rotary hinge 24, and the voice coil actuator 27 that are provided at the one end side of the mounting surface 4 in the Y-axis direction. The reaction mass drive mechanism 3 includes the movable part 6, the fixed part 7, the relative angle sensor 23, the rotary hinge 24, and the voice coil actuator 27 that are provided at the other end side of the mounting surface 4 member in the Y-axis direction.

In the mechanical system 110-4, the relative angle sensor 23 is provided at each of the one end side and the other end side of the mounting surface 4 in the Y-axis direction. The relative angle sensor 23 is provided between the movable part 6 and the fixed part 7 of each of the drive mechanism 2 and the reaction mass drive mechanism 3. The relative angle sensor 23 measures a relative relationship between the movable part 6 and the fixed part 7 of each of the drive mechanism 2 and the reaction mass drive mechanism 3. In other words, the relative angle sensor 23 measures a relative relationship between the movable part 6 and the base.

As described above, in the mechanical system 110-4, the drive mechanism 2 and the reaction mass drive mechanism 3 are supported by the mounting surface 4 via the rotary hinges 24 to be each able to rotate independently.

As with the first to third embodiments, in the reaction compensation device 100 according to the fourth embodiment, the reaction mass drive mechanism 3 generates the force and torque having the same magnitude as and in anti-phase with the force and torque generated by the drive of the drive mechanism 2, so that the force and torque generated by the drive of the drive mechanism 2 and the force and torque in anti-phase therewith generated by the reaction mass drive mechanism 3 cancel each other out, thereby making it possible to reduce the disturbance 30 (force and torque) generated by the drive of the drive mechanism 2.

Fifth Embodiment

Figure 6:
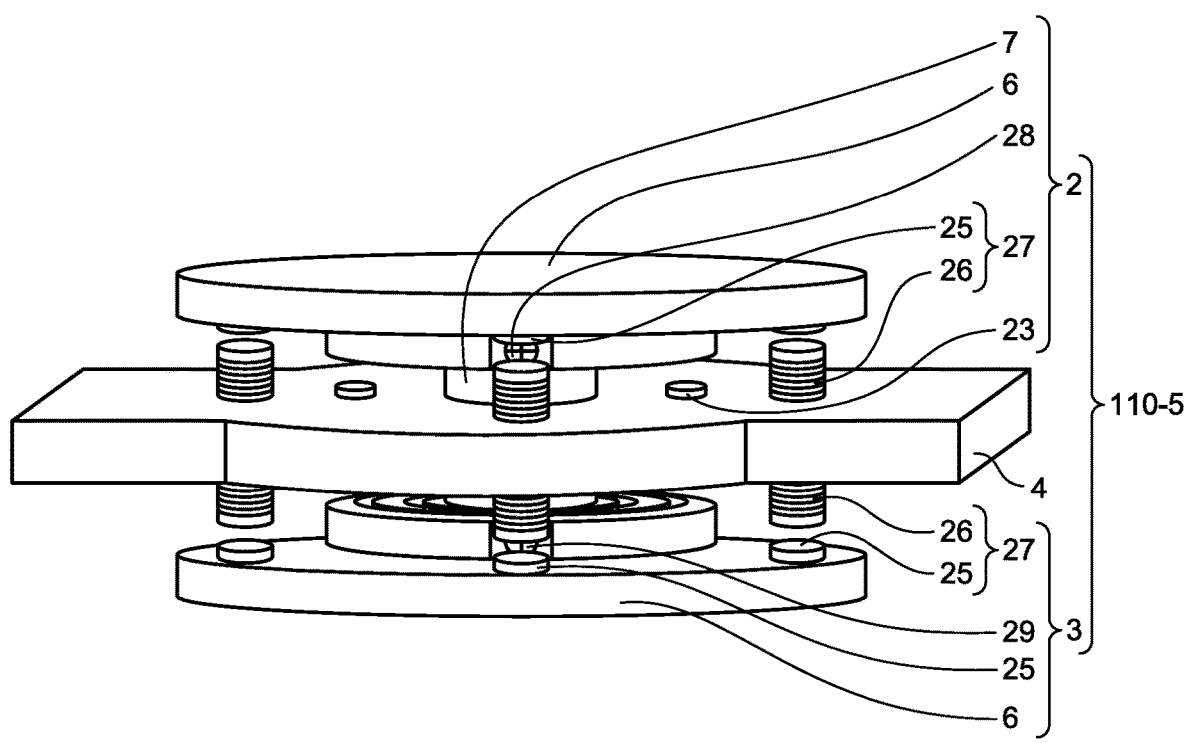
FIG. 6 is a configuration diagram of a mechanical system included in the reaction compensation device according to a fifth embodiment of the present invention.
Figure 7:
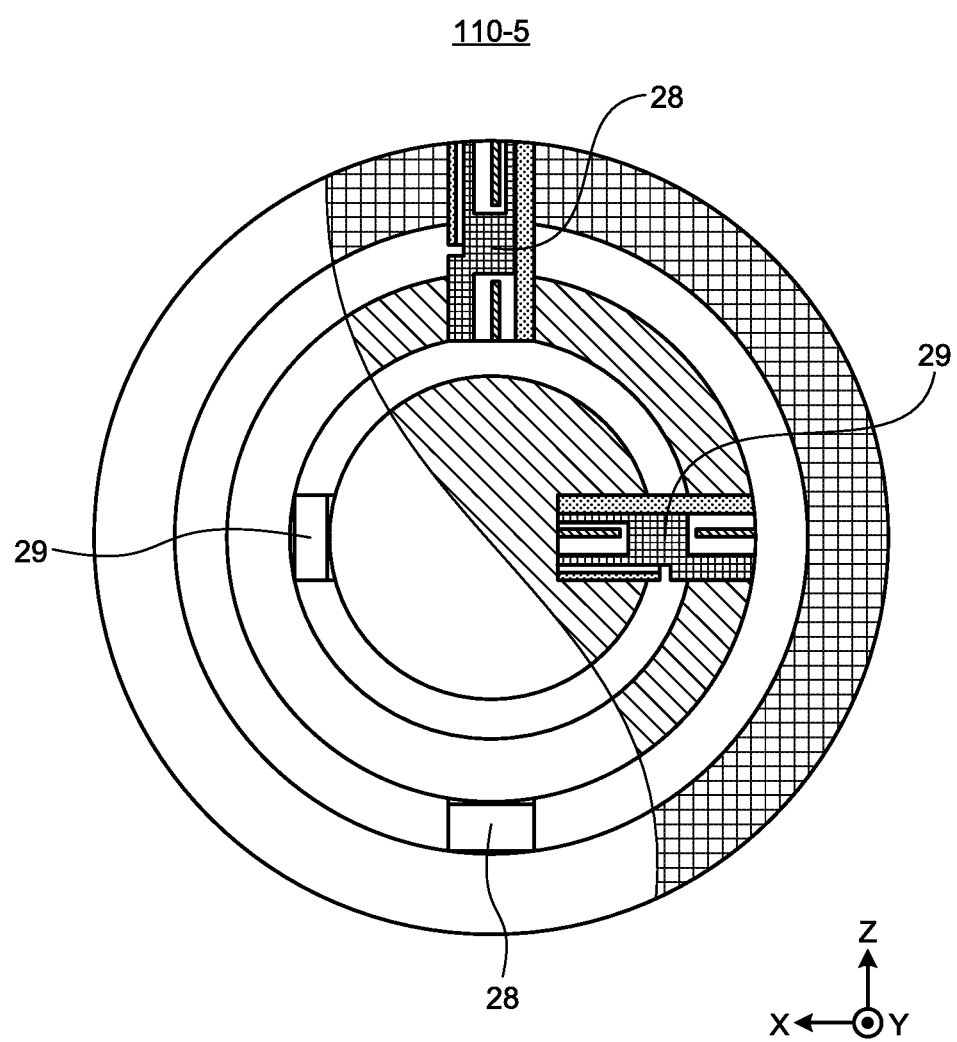
FIG. 7 is a plan view of a rotary bearing portion of the mechanical system illustrated in FIG. 6, as viewed in a Y-axis direction.

FIG. 6 is a configuration diagram of a mechanical system 110-5 included in the reaction compensation device 100 according to a fifth embodiment of the present invention. FIG. 7 is a plan view of a rotary bearing portion of the mechanical system 110-5 illustrated in FIG. 6, as viewed in the Y-axis direction. In the fourth embodiment, the drive mechanism 2 and the reaction mass drive mechanism 3 are installed on the one end face and the other end face of the mounting surface 4 in the Y-axis direction to be a uniaxial rotary mechanism, but the drive mechanism 2 and the reaction mass drive mechanism 3 may be each a biaxial rotary mechanism. Hereinafter, rotary shafts in two axes will be referred to as a first rotation axis 28 and a second rotation axis 29.

As illustrated in FIGS. 6 and 7, the drive mechanism 2 has a degree of freedom of rotation about two axes, where the first rotation axis 28 and the second rotation axis 29 are disposed to be orthogonal to each other. The reaction mass drive mechanism 3 also has a degree of freedom of rotation about two axes as with the drive mechanism 2. The voice coil actuator 27 of the drive mechanism 2 is configured such that the permanent magnet 25 is provided on the movable part 6 of the drive mechanism 2 while the coil 26 is provided on the mounting surface 4 as illustrated in the fourth embodiment. The voice coil actuator 27 responsible for the rotational motion of the first rotation axis 28 is disposed at two locations symmetrically about a supporting center.

An actuator responsible for the rotational motion of the second rotation axis 29 is disposed at a position that is shifted in phase by 90 degrees from the location of the voice coil actuator 27 responsible for the first rotation axis 28. The configuration and arrangement of the actuators are the same for both the drive mechanism 2 and the reaction mass drive mechanism 3.

In the mechanical system 110-5 of the fifth embodiment, four voice coil actuators 27 are provided for each of the drive mechanism 2 and the reaction mass drive mechanism 3.

The relative angle sensor 23 used for feedback control of the actuator is placed to be able to measure an angle of rotation of the movable part 6 and the fixed part 7 around each of the first rotation axis 28 and the second rotation axis 29. In other words, the relative angle sensor 23 measures a relative angle of rotation between the movable part 6 and the base.

According to the fifth embodiment, the reaction compensation device 100 can independently control the first rotation axis 28 and the second rotation axis 29 in the device 5 in which the drive mechanism 2 is required to rotate about the two axes, and the reaction mass drive mechanism 3 generates the force and torque having the same magnitude as and in anti-phase with the force and torque generated by the drive of the drive mechanism 2, so that the force and torque generated by the drive of the drive mechanism 2 and the force and torque in anti-phase therewith generated by the reaction mass drive mechanism 3 cancel each other out, making it possible to reduce the disturbance 30 (force and torque) generated by the drive of the drive mechanism 2.

Sixth Embodiment

Figure 8:
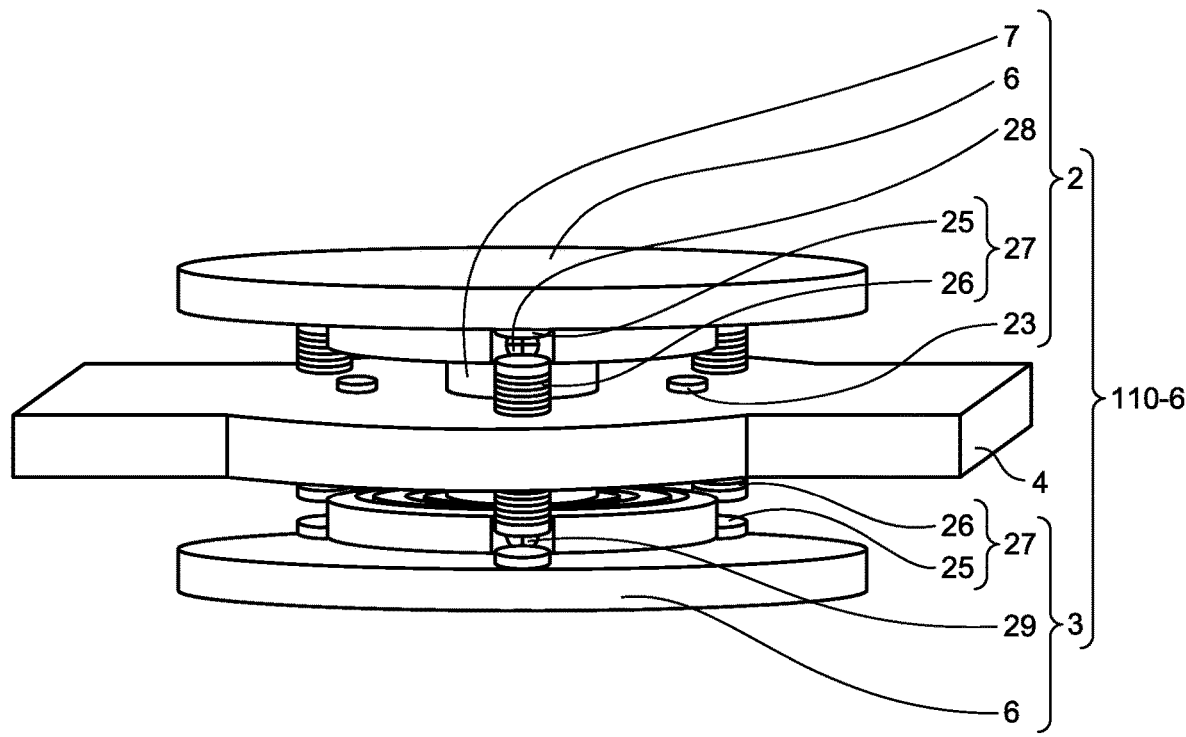
FIG. 8 is a configuration diagram of a mechanical system included in the reaction compensation device according to a sixth embodiment of the present invention.

FIG. 8 is a configuration diagram of a mechanical system 110-6 included in the reaction compensation device 100 according to a sixth embodiment of the present invention. In the fifth embodiment, the rotary axes of the drive mechanism 2 and the reaction mass drive mechanism 3 are configured to each rotate independently, and four voice coil actuators 27 are provided in each of the drive mechanism 2 and the reaction mass drive mechanism 3. In the mechanical system 110-6 according to the sixth embodiment, three voice coil actuators 27 are provided in each of the drive mechanism 2 and the reaction mass drive mechanism 3, and the three voice coil actuators 27 provided to the mechanisms 2 and 3, respectively are placed such that their phases in the rotational direction are shifted from one another by 120 degrees.

The reaction compensation device 100 according to the sixth embodiment can achieve a degree of freedom of rotation about two axes while reducing the number of the voice coil actuators 27 as compared to the fifth embodiment. This can reduce the number of components for the device 5 including the reaction compensation device 100 and reduce the total mass of the device 5.

Seventh Embodiment

In the fifth embodiment, the rotary axes of the drive mechanism 2 and the reaction mass drive mechanism 3 are configured to each rotate independently, and four voice coil actuators 27 are provided in each of the drive mechanism 2 and the reaction mass drive mechanism 3. In the reaction compensation device 100 according to the seventh embodiment, one voice coil actuator 27 is used for the rotational motion of the first rotation axis 28, and the voice coil actuator 27 for the rotational motion of the second rotation axis 29 is disposed to have a phase shifted by 90 degrees in the rotational direction with respect to the voice coil actuator 27 provided for the rotational motion of the first rotation axis 28.

The reaction compensation device 100 according to the seventh embodiment can achieve a degree of freedom of rotation about two axes while reducing the number of the voice coil actuators 27 as compared to the fifth embodiment. This can reduce the number of components for the device 5 including the reaction compensation device 100 and reduce the total mass of the device 5.

Eighth Embodiment

In the fourth to seventh embodiments, each of the drive mechanism 2 and the reaction mass drive mechanism 3 has the permanent magnets 25 disposed on the movable part 6 and the coils 26 disposed on the fixed part 7. The reaction compensation device 100 according to an eighth embodiment uses the voice coil actuator 27 of a so-called moving coil type in which the coil 26 is disposed on the movable part 6 and the permanent magnet 25 is disposed on the fixed part 7 or the mounting surface 4.

The reaction compensation device 100 according to the eighth embodiment can obtain an effect similar to that of the reaction compensation device 100 according to the fourth to seventh embodiments that uses the voice coil actuator 27 of the moving magnet type.

Ninth Embodiment

Figure 9:
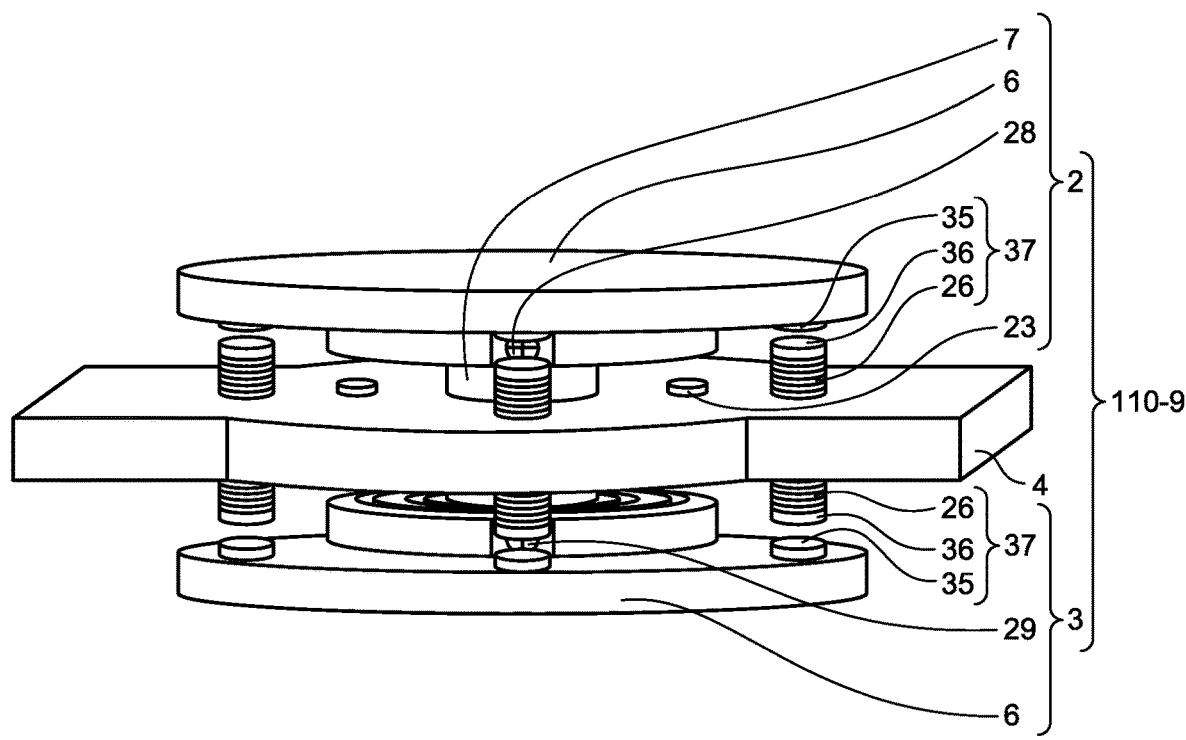
FIG. 9 is a configuration diagram of a mechanical system included in the reaction compensation device according to a ninth embodiment of the present invention.

FIG. 9 is a configuration diagram of a mechanical system included in the reaction compensation device according to a ninth embodiment of the present invention. In the fourth to eighth embodiments, each of the drive mechanism 2 and the reaction mass drive mechanism 3 has the permanent magnets 25 disposed on the movable part 6 and the coils 26 disposed on the fixed part 7. As illustrated in FIG. 9, a mechanical system 110-9 included in the reaction compensation device 100 according to the ninth embodiment uses an electromagnetic attraction type actuator 37 in which a movable part core 35 is disposed on the movable part 6 and a fixed part core 36 and the coil 26 are disposed on the fixed part 7. The movable part core 35 is provided on the movable part of each of the drive mechanism and the reaction mass drive mechanism. The fixed part core 36 is provided on the base to face the movable core 35, and the coil 26 is disposed around the fixed part core 36.

The reaction compensation device 100 according to the ninth embodiment can drive the drive mechanism 2 and the reaction mass drive mechanism 3 as with the reaction compensation device 100 of the fourth to eighth embodiments using the voice coil actuator 27, and can obtain an effect similar to that of the reaction compensation device 100 of the fourth to eighth embodiments. Note that in the reaction compensation device 100 according to the ninth embodiment, the fixed part core 36 and the coil 26 are provided on the base 4 while the movable part core 35 is provided on the movable part 6, but in the reaction compensation device 100 according to the ninth embodiment, a single core equivalent to the movable part core 35 may be provided on the base 4 while a core equivalent to the fixed part core 36 and the coil 26 therearound may be provided on the movable part 6.

Tenth Embodiment

Figure 10:
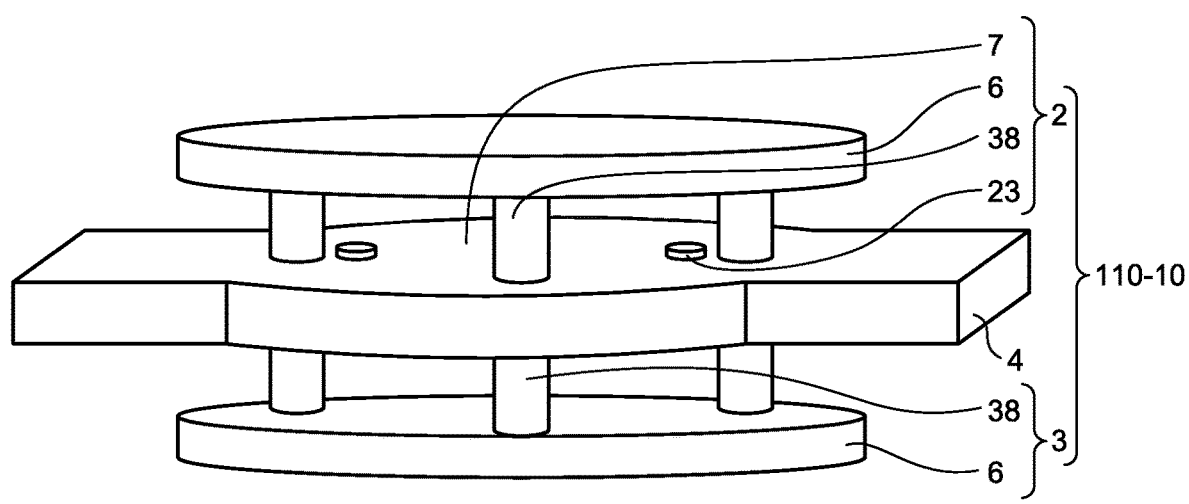
FIG. 10 is a configuration diagram of a mechanical system included in the reaction compensation device according to a tenth embodiment of the present invention.

FIG. 10 is a configuration diagram of a mechanical system included in the reaction compensation device according to a tenth embodiment of the present invention. In the fourth to eighth embodiments, the first rotation axis 28 and the second rotation axis 29 are used for the drive mechanism 2 and the reaction mass drive mechanism 3, and the voice coil motor is used for the voice coil actuator 27 for the rotational motion. In a mechanical system 110-10 included in the reaction compensation device 100 according to the tenth embodiment, the first rotation axis 28 and the second rotation axis 29 are omitted and a piezo actuator 38 is used for the voice coil actuator 27, as illustrated in FIG. 10.

The reaction compensation device 100 according to the tenth embodiment can drive the drive mechanism 2 and the reaction mass drive mechanism 3 as with the reaction compensation device 100 of the fourth to eighth embodiments using the voice coil actuator 27, and can obtain an effect similar to that of the reaction compensation device 100 of the fourth to eighth embodiments.

Eleventh Embodiment

Figure 11:
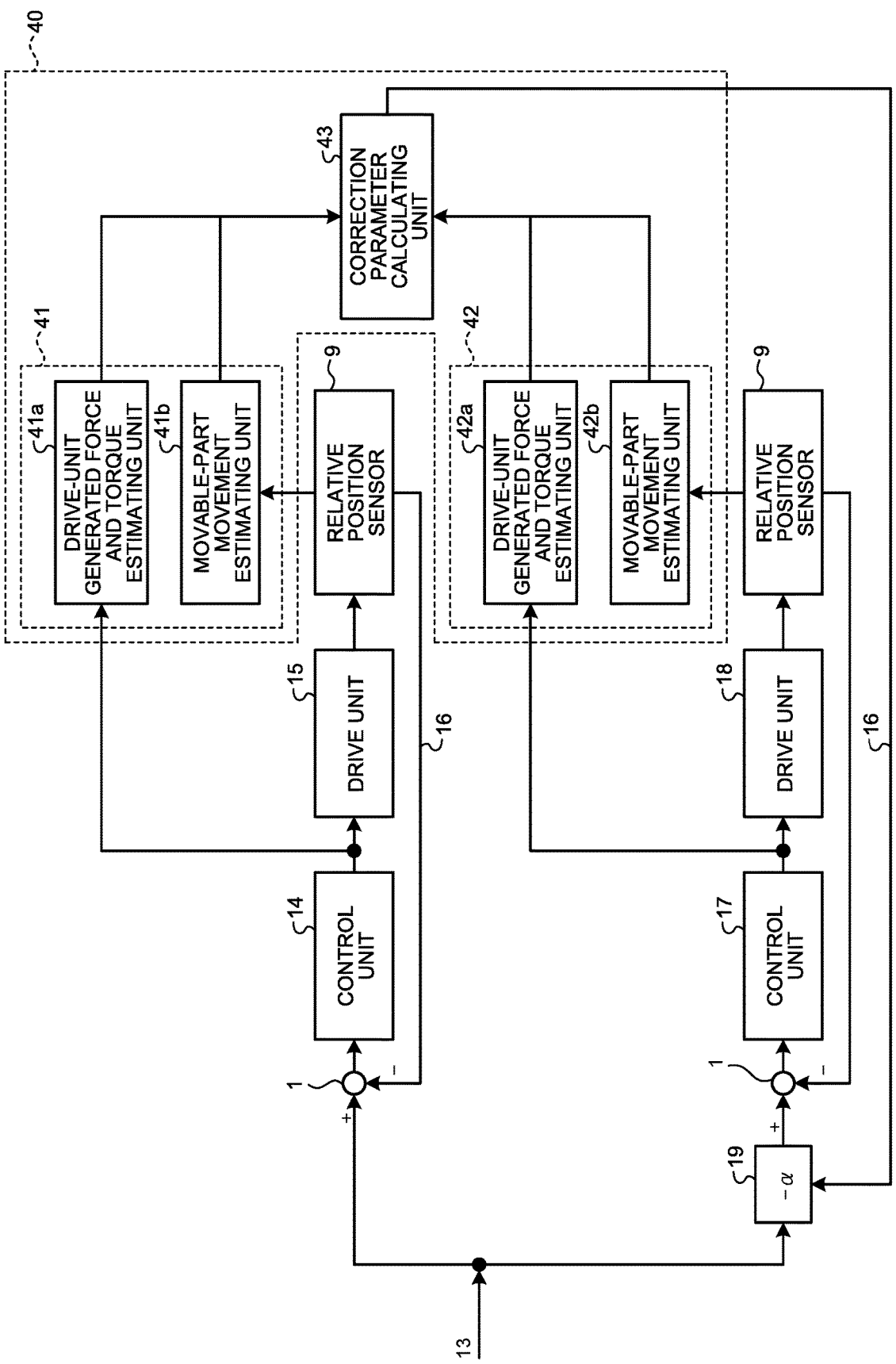
FIG. 11 is a configuration diagram of a control system included in the reaction compensation device according to an eleventh embodiment of the present invention.

FIG. 11 is a configuration diagram of a control system included in the reaction compensation device according to an eleventh embodiment of the present invention. The first embodiment has a configuration for control circuitry based on the assumption that the calculation of the correction parameter α involves recognition of the mass property consisting of the mass or moment of inertia measured in advance, but a different configuration may be employed.

As illustrated in FIG. 11, a control system 120-11 included in the reaction compensation device 100 according to the eleventh embodiment includes the control units 14 and 17, the drive units 15 and 18, and a correction parameter estimating unit 40. The correction parameter estimating unit 40 includes a first mass property estimating unit 41, a second mass property estimating unit 42, and a correction parameter calculating unit 43.

The first mass property estimating unit 41 includes a first-drive-unit generated force and torque estimating unit 41a and a first-movable-part movement estimating unit 41b. The first-drive-unit generated force and torque estimating unit 41a estimates the force or torque generated from the drive unit 15 of the drive mechanism. The first-movable-part movement estimating unit 41b estimates the movement of the movable part of the drive mechanism on the basis of data outputted from the relative position sensor 9 which is the first relative position sensor.

The second mass property estimating unit 42 includes a second-drive-unit generated force and torque estimating unit 42a and a second-movable-part movement estimating unit 42b. The second-drive-unit generated force and torque estimating part 42a estimates the force or torque generated from the drive unit 18 of the reaction mass drive mechanism. The second-movable-part movement estimating unit 42b estimates the movement of the movable part of the drive mechanism on the basis of data outputted from the relative position sensor 9 which is the second relative position sensor.

The correction parameter calculating unit 43 calculates the correction parameter a on the basis of the drive-unit generated forces or torques outputted from the first-drive-unit generated force and torque estimating unit 41a and the second-drive-unit generated force and torque estimating unit 42a, and the movable-part drive data outputted from the first-movable-part movement estimating unit 41b and the second-movable-part movement estimating unit 42b.

The control system 120-11 configured as described above can recognize the numerical values of the mass and moment of inertia of the movable part 6 of the drive mechanism 2 and the numerical values of the mass and moment of inertia of the movable part 6 of the reaction mass drive mechanism 3 by driving the drive mechanisms. Moreover, the correction parameter α can be changed even when the mass property changes while the reaction compensation device is being used.

Twelfth Embodiment

In the eleventh embodiment, the movement of the movable part of the reaction mass drive mechanism is estimated on the basis of the data outputted from each of the first relative position sensor and the second relative position sensor when the movement of the movable part of the other drive mechanism is estimated. However, an accelerometer or an inertial sensor such as an angular velocity sensor which makes it possible to directly measure the movement of the movable part of the drive mechanism and the movement of the movable part of the reaction mass drive mechanism is disposed and a signal or signals outputted from them are used to estimate the movement of the movable part of the drive mechanism and the movement of the movable part of the reaction mass drive mechanism. Accordingly, the correction parameter α can be estimated even if the relative position sensor fails.

Thirteenth Embodiment

Figure 12:
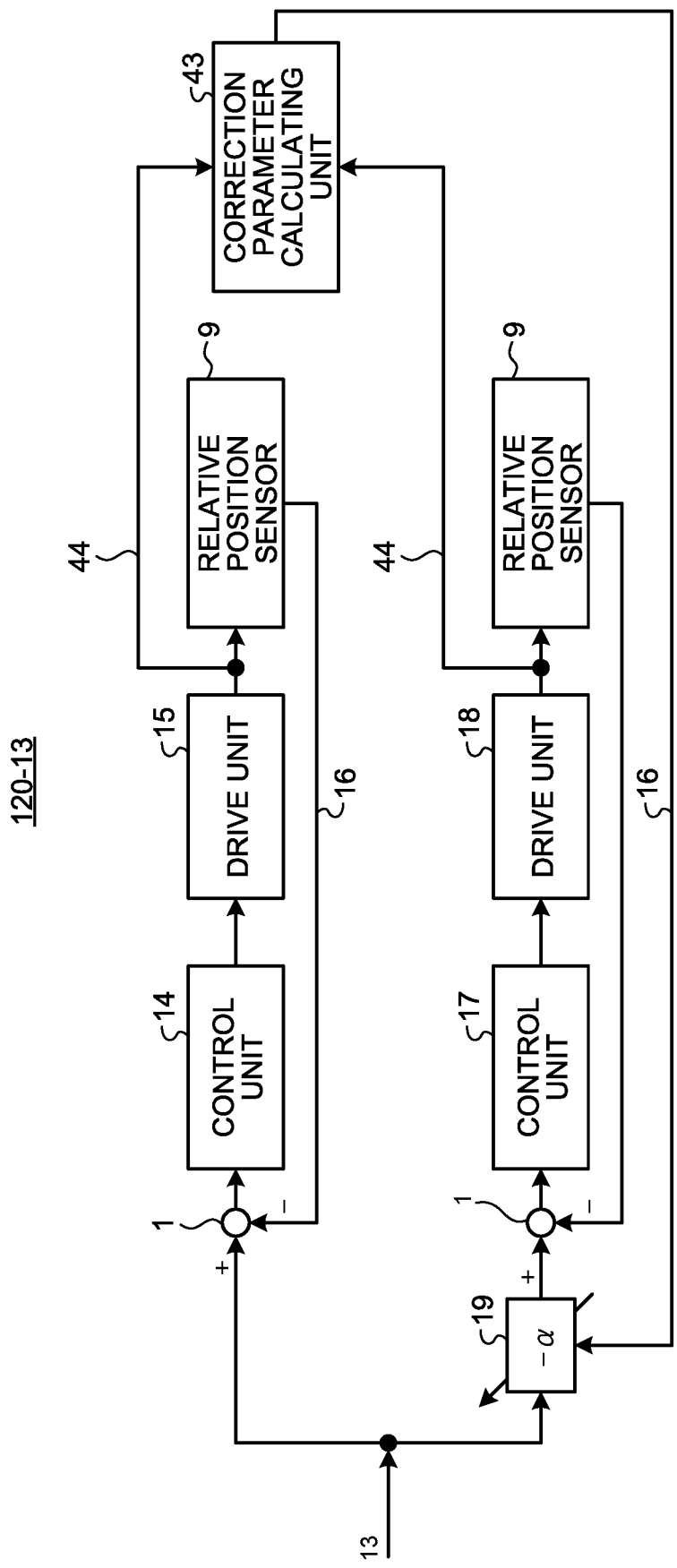
FIG. 12 is a configuration diagram of a control system included in the reaction compensation device according to a thirteenth embodiment of the present invention.

FIG. 12 is a configuration diagram of a control system included in the reaction compensation device according to a thirteenth embodiment of the present invention. The eleventh embodiment describes the configuration of the control circuit that calculates the correction parameter α on the basis of the drive-unit generated forces or torques outputted from the first-drive-unit generated force and torque estimating unit 41a and the second-drive-unit generated force and torque estimating unit 42a and the movable-part drive data outputted from the first-movable-part movement estimating unit 41b and the second-movable-part movement estimating unit 42b. On the other hand, as is the case for a control system 120-13 according to the thirteenth embodiment illustrated in FIG. 12, the correction parameter calculating unit 43 estimating the correction parameter a may measure the vibration of the base using a vibration sensor and an acceleration sensor and adjust the correction parameter α while driving the second drive unit so that the vibration of the base becomes zero, that is, the acceleration of the mounting surface 4 generated in association with the drive of the drive unit 15 becomes zero. In measuring the vibration of the base using the vibration sensor and the acceleration sensor, the correction parameter calculating unit 43 uses a vibration response signal 44 between the drive unit 15 and the relative position sensor 9 and a vibration response signal 44 between the drive unit 18 and the relative position sensor 9. In an example of a specific method of adjusting the correction parameter α, the second control system temporarily sets the value of the correction parameter α in the method of setting the correction parameter α according to the first embodiment or the like, estimates a driving condition range of the first drive unit to change the driving range of the first drive unit in two or more patterns from a wide driving range to a narrow driving range and generate a command value corresponding to each driving range, drives the first and second drive units based on the command value, and adjusts the correction parameter a to be an optimum value such that the vibration response of the base generated at that time of driving is less than or equal to a threshold.

In this case, the first-drive-unit generated force and torque estimating unit 41a, the second-drive-unit generated force and torque estimating unit 42a, the first-movable-part movement estimating unit 41b, and the second-movable-part movement estimating unit 42b illustrated in the eleventh embodiment may be unnecessary, and so the configuration can be simplified.

Moreover, installation of the reaction compensation device 100 according to the fourth to tenth embodiments in a fast steering mirror system (not illustrated) can provide a directivity control mirror having the performance equivalent to that of the reaction compensation device 100 according to the fourth to tenth embodiments.

The configuration illustrated in the aforementioned embodiment merely illustrates an example of the content of the preset invention, and can thus be combined with other publicly known techniques or partially omitted and/or modified without departing from the scope of the present invention.

REFERENCE SIGNS LIST 1 subtraction unit; 2 drive mechanism; 3 reaction mass drive mechanism; 4 mounting surface; 5 device; 6 movable part; 7 fixed part; 9 relative position sensor; 11 first control system; 12 second control system; 13 command value; 14, 17 control unit; 15, 18 drive unit; 16 sensor output signal; 19 correction parameter unit; 20 support base; 21 rotary shaft; 22 rotary drive mechanism; 23 relative angle sensor; 24 rotary hinge; 25 permanent magnet; 26 coil; 27 voice coil actuator; 28 first rotation axis; 29 second rotation axis; 30 disturbance; 35 movable part core; 36 fixed part core; 37 electromagnetic attraction type actuator; 38 piezo actuator; 40 correction parameter estimating unit; 41 first mass property estimating unit; 41a first-drive-unit generated force and torque estimating unit; 41b first-movable-part movement estimating unit; 42 second mass property estimating unit; 42a second-drive-unit generated force and torque estimating unit; 42b second-movable-part movement estimating unit; 43 correction parameter calculating unit; 44 vibration response signal; 100 reaction compensation device; 110, 110-2, 110-4, 110-5, 110-6, 110-9, 110-10 mechanical system; 120, 120-11, 120-13 control system.

The invention claimed is:
1. A reaction compensation device comprising:
a base;
a driver to drive a first movable part with respect to the base;
a reaction mass driver to drive a second movable part with respect to the base;
a first relative position sensor to measure a relative position between the first movable part and the base;
a second relative position sensor to measure a relative position between the second movable part and the base;
a first control system to receive a signal outputted from the first relative position sensor as a feedback signal in response to an inputted command value to control the driver; and
a second control system to correct the command value based on a correction parameter for adjusting a difference between a mass property of the driver and a mass property of the reaction mass driver, and receive a signal outputted from the second relative position sensor as a feedback signal to control the reaction mass driver,
wherein the second control system includes:
first generated force and torque estimating circuitry to estimate a force or torque by which the driver drives the first movable part;
first-movable-part movement estimating circuitry to estimate a movement of the first movable part on the basis of the signal outputted from the first relative position sensor;
second generated force and torque estimating circuitry to estimate a force or torque by which the reaction mass driver drives the second movable part using a control signal outputted from the second control system; and
second-movable-part movement estimating circuitry to estimate a movement of the second movable part on the basis of the signal outputted from the second relative position sensor, and
the correction parameter is obtained based on data outputted from the first generated force and torque estimating circuitry, the first-movable-part movement estimating circuitry, the second generated force and torque estimating circuitry, and the second-movable-part movement estimating circuitry, or
wherein the reaction compensation device further comprises a vibration sensor to measure vibration of the base, and the second control system temporarily sets the correction parameter, obtains vibration measured by the vibration sensor by experimentally setting the command value to control the driver and the reaction mass driver, and obtains the correction parameter with which the vibration measured by the vibration sensor is equal to or less than a threshold while correcting the correction parameter sequentially.

2. The reaction compensation device according to claim 1, wherein the driver and the reaction mass driver are rotary drivers.

3. The reaction compensation device according to claim 2, wherein an actuator of the rotary driver is a voice coil actuator.

4. The reaction compensation device according to claim 3, wherein the actuator of the rotary driver includes a permanent magnet that is provided to each of the first and second movable parts of the driver and the reaction mass driver, and a coil that is provided on the base while facing the permanent magnet.

5. The reaction compensation device according to claim 3, wherein the actuator of the rotary driver includes a permanent magnet that is provided to the base, and a coil that is provided to each of the first and second movable parts of the driver and the reaction mass driver while facing the permanent magnet.

6. The reaction compensation device according to claim 2, wherein an actuator of the rotary driver is an electromagnetic attraction type actuator that uses an electromagnet.

7. The reaction compensation device according to claim 6, wherein the electromagnetic attraction type actuator includes a movable part core that is provided to each of the first and second movable parts of the driver and the reaction mass driver, a fixed part core that is provided to the base while facing the movable part core, and a coil that is disposed around the fixed part core.

8. The reaction compensation device according to claim 6, further comprising a core with a coil around the core that is provided to each of the first movable part and the second movable part, and a core that is provided to the base while facing the core.

9. The reaction compensation device according to claim 2, wherein an actuator of the rotary driver is a piezo actuator.

10. A fast steering mirror system comprising the reaction compensation device according to claim 1.

11. The fast steering mirror system according to claim 10, wherein the driver and the reaction mass driver are rotary drivers.

12. The fast steering mirror system according to claim 11, wherein an actuator of the rotary driver is a voice coil actuator.

13. The fast steering mirror system according to claim 11, wherein an actuator of the rotary driver is an electromagnetic attraction type actuator that uses an electromagnet.

14. The fast steering mirror system according to claim 11, wherein an actuator of the rotary driver is a piezo actuator.

15. The fast steering mirror system according to claim 10, wherein the driver and the reaction mass driver are translational drivers.

16. The reaction compensation device according to claim 1, wherein the driver and the reaction mass driver are translational drivers.

17. The reaction compensation device according to claim 1, wherein a mass of the reaction mass driver is smaller than a mass of the driver, and the correction parameter has a value of 1.0 or higher.

18. The reaction compensation device according to claim 1, wherein the correction parameter is a ratio of a mass of the driver to a mass of the reaction mass driver, or a ratio of a moment of inertia of the driver to a moment of inertia of the reaction mass driver.

* * * * *